United States Patent [19]
Zuckerman et al.

[11] 3,937,861
[45] Feb. 10, 1976

[54] FLOOR COVERING FOR ATHLETIC FACILITY

[75] Inventors: Joseph L. Zuckerman, Livingston; Carl R. Eckardt, Morris Plains; Robert V. Bertotti, New Milford, all of N.J.

[73] Assignee: J. P. Stevens & Co., Inc., New York, N.Y.

[22] Filed: May 6, 1974

[21] Appl. No.: 466,921

[52] U.S. Cl. ............... 428/235; 428/234; 428/300; 428/301; 428/303; 428/310; 428/315
[51] Int. Cl.² .. B32B 5/02; B32B 29/00; D03D 3/00
[58] Field of Search ........... 161/154, 159, 160, 165, 161/80, 81, 67, 89, 190; 428/315, 317, 310, 280, 300, 234, 255, 235, 262, 265, 272, 301, 303

[56] References Cited
UNITED STATES PATENTS

| | | | |
|---|---|---|---|
| 3,227,574 | 1/1966 | Mohr | 161/67 UX |
| 3,441,464 | 4/1969 | Blue | 161/154 X |
| 3,451,885 | 6/1969 | Klein | 161/80 |
| 3,574,107 | 4/1971 | Hurka | 161/67 |
| 3,594,352 | 7/1971 | Lloyd et al. | 260/187 N X |
| 3,595,814 | 7/1971 | Lloyd et al. | 264/48 X |
| 3,821,067 | 6/1974 | Taylor et al. | 161/67 |

*Primary Examiner*—Lorraine L. Kendell
*Attorney, Agent, or Firm*—Michael T. Frimer; Charles Stein

[57] ABSTRACT

A multilayer floor covering is provided which is suitable for use as a playing surface of an athletic facility. The floor covering comprises a composite needlepunched material in which a fiber batt bottom layer is needled into a support layer so that a portion of the fiber batt protrudes through the top of the support layer, a layer of polyurethane elastomer adhered to the composite needlepunched material and a top wear coating of polyurethane adhered to the layer of urethane elastomer.

6 Claims, 1 Drawing Figure

U.S. Patent  Feb. 10, 1976  3,937,861
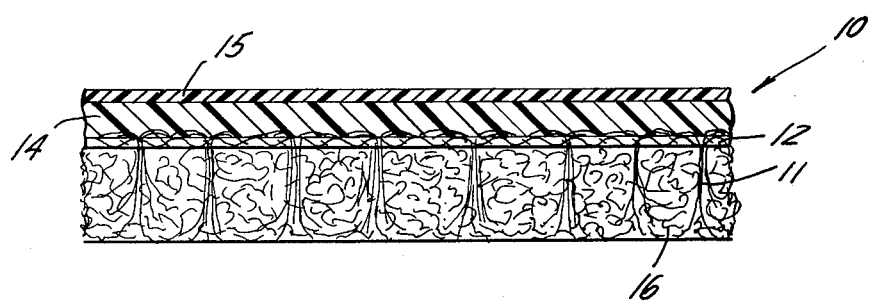

FLOOR COVERING FOR ATHLETIC FACILITY

The present invention relates to a novel laminated material suitable for use as a floor covering for an athletic facility.

The playing surface of an athletic facility such as a field house must meet many strict requirements. To meet the requirements of a particular sport such as basketball, surfaces have been used which not only necessitate expensive maintenance but are unsuitable for other sports and other uses. For instance, the wooden floors used on basketball courts must be frequently refinished and are damaged by contact with footwear other than sneakers.

In accordance with the present invention, there is provided a floor covering for an athletic facility which is characterized by a rugged surface structure, good dimensional stability, low compression set, a basketball bounce similar to that of a wooden floor, friction characteristics designed for safe running and stopping, self-healing when penetrated by spiked shoes, ability to support loads, low slip when wet and comfortable feel underfoot. These characteristics make the present floor covering material suitable as a surface for a wide variety of sports as well as other uses such as dancing, an auditorium floor, etc.

The floor covering material is a laminate containing a number of layers each of which performs a specific function and the combination of which give the properties described above. The lower portion of the laminate is a composite needlepunched material in which the bottom layer is a fibrous batt that has been needled into a fabric or film support layer so that a minor portion of the batt protrudes through the support layer while the bulk of the fibrous batt remains as a fiber layer at least 1/16 inch thick. A layer of polyurethane elastomer is adhered to the composite needlepunched material and a wear coating of abrasion resistant polyurethane is adhered to the top of the urethane elastomer layer. Preferably, the elastomer is applied to the support side of the composite needlepunched material so that the fiber layer of at least 1/16 inch thickness forms the bottom layer of the floor covering material. However, a satisfactory product can also be obtained when the composite needlepunched material is reversed and the elastomer adhered to the fiber layer.

Referring to the drawing, there is shown a multilayer product 10 having as its bottom structure a needlepunched material formed from a fibrous batt 11 which has been needled into a support layer 12 of woven fabric so that a portion of the fiber batt 11 protrudes through the top of the support layer, but a major portion of the fiber batt forms a layer of fibers 16 on the bottom of the product. A layer of polyurethane elastomer 14 is adhered to the top of the support layer and is covered with an abrasion resistant polyurethane coating 15.

The fiber batt used in the bottom layer should be at least 9 ounces per square yard, preferably 10–80 ounces per square yard, and in the final product the layer of fibers below the support layer 12 must be at least 1/16 inch thick, preferably within the range of 1/16 to 5/16 inch in thickness. This layer serves as a resilient pad and provides comfort underfoot. Additionally, this layer prevents spikes, cleats or other similar sharp articles from penetrating through to the floor. The fiber batt can be made from any of the fibers commonly used in the production of needlepunched carpeting such as nylon, polypropylene, polyester, acrylic fibers and mixtures thereof.

The fiber batt is needled into a support so that a portion of the fiber batt protrudes through the support layer. Generally, the needle density is in the range of about 200 to 1600 punches per square inch. The support layer is preferably a woven or knitted fabric but can also be a nonwoven fabric or a polymeric film. In addition to anchoring the fiber batt, the support layer provides dimensional stability to the final product. The support layer preferably has a weight of about 2 to 5 ounces per square yard. Thus, the total weight of the composite of the fiber batt plus the support layer is preferably between about 12 and 85 ounces per square yard. The resilience of this composite should be in the range of about 10 to 30, measured as the percent rebound of a 7/8 inch diameter, 46 gram steel ball dropped from a height of one meter.

In the preferred embodiment shown in the drawing, the portion of the fiber batt protruding through the support layer provides points of solid attachment for the subsequent layer applied on top of the support layer. Optionally, the portion of the fiber batt protruding through the support layer can be impregnated with a latex composition which will more firmly lock the fibers in place. It is also possible to obtain a satisfactory product by reversing the needlepunched material so that the polyurethane elastomer is applied to fiber layer 16.

When the elastomeric polyurethane layer used as less than 3/16 inch in thickness, it is sometimes difficult to obtain a product having a smooth upper surface if the side of the needlepunched material to which the elastomer layer is applied has a rough fibrous surface. To insure a smooth product when using such an elastomeric layer, it is preferable to apply the elastomer to a surface which has been impregnated with a latex composition as described above or to smooth the surface of the needlepunched material such as by singeing, buffing or shearing.

The elastomeric polyurethane layer bonded to the composite needlepunched material provides resilience, ball bounce, foot comfort and self-sealing. The layer of polyurethane elastomer is preferably 3/64 to ⅜ inch in thickness and weighs about 40 to 360 ounces per square yard. Other required properties of this layer are set forth in TABLE I.

TABLE I

| POLYURETHANE ELASTOMER PROPERTIES | |
|---|---|
| Property | Requirements |
| Density (gm/cm$^3$) | 0.5 to 1.6 |
| Hardness (Shore A)[1] | 30 to 90 |
| Resilience[2] | 20 to 50 |
| Compression Set[3] (percent) | maximum of 35 |
| Compression Strength (10 percent deflection p.s.i.) | 30 to 200 |
| Compression Strength (50 percent deflection p.s.i.) | 200 to 1800 |
| Ultimate Elongation (percent) | 80 — minimum |
| Ultimate Tensile Strength (p.s.i.) | 200 — minimum |
| Tear Strength[4] (p.l.i.) | 50 — minimum |
| Cold Crack (180° Bend, No Crack) | Pass 40°F. |
| Water Absorption[5] | Maximum of 6 |
| Taber Abrasion (weight loss milligrams)[6] | Maximum of 4000 |

TABLE I-continued

| POLYURETHANE ELASTOMER PROPERTIES | |
|---|---|
| Property | Requirements |
| Flammability, Pill Test (DOC-FF-2-70) | Pass |

[1]ASTM D-2240-68, measured one week after curing.
[2]Percent rebound of ⅝ inch diameter steel ball weighing 46 grams dropped from a height of one meter.
[3]ASTM D-395, Method B, 50 percent compression for 72 hours at 23°C.
[4]ASTM D-624, Die C.
[5]168 hours at 23°C. percent weight gain.
[6]CS 17 wheel, 500 grams per wheel, 5,000 cycles.

The elastomer layer is further characterized in that the holes formed by ⅝ inch length needle-track spikes reclose after removal of the spikes. It is preferred that polyurethane elastomer be resistant to burning cigarettes. Such resistance is obtained by using polyurethane elastomers which are thermosetting, such as those obtained by reacting polyester polyols with isocyanates employing greater than stoichiometric amounts of isocyanate and/or using at least one reactant with a functionality greater than two. With therosetting polyurethanes, no surface deformation is caused by a cigarette laid on the surface burning from end to end.

There are presently many known polyurethane elastomers which meet the above requirements. Suitable polyurethane elastomers are disclosed in U.S. Pat. Nos. 3,594,352 and 3,595,814.

Specific examples of polyurethane compositions which meet the requirements of this invention are as follows:

A. The composition of Example III, U.S. Pat. No. 3,595,814. which contains a carbamate.

B. The compositions of Examples II and III of U.S. Pat. No. 3,594,352.

C. A composition prepared by combining 6.8 grams of a blend of crude polyaryl polyisocyanate and diphenylmethanediisocyanate (functionality 2.3, equivalent weight 133 per N=C=O group, sold commercially as PAPI 901 by Upjohn Co.) with the following blend and then curing:

| | |
|---|---|
| Polypropylene Glycol (molecular weight 2200) | 53.3 grams |
| Calcined Kaolin | 40.0 grams |
| Stannous Octoate | 0.3 grams |

D. A prepolymer prepared by heating together for 3 hours at 70°C., a mixture 1700 grams of poly(propylene oxide) adduct of trimethylolpropane (molecular weight 1600) and 400 grams of toluene diisocyanate (80 percent 2, 4/20 percent 2,6, isomer). The prepolymer is blended with a premixture of the following composition and cured for one week at room temperature.

| | |
|---|---|
| Polypropylene glycol (molecular weight 1300) | 1300 grams |
| Zinc oxide | 2500 grams |
| Dibutyltindilaurate | 17 grams |
| 2,6 di(tertiary butyl) para cresol | 4 grams |

E. 6.6 Grams of Methylene bis (Orthochlor Aniline) are melted and blended with 150 grams of polypropylene glycol (molecular weight 2000). To this blend are added 0.06 grams of Stannous Octoate, 10 grams of titanium dioxide and 10 grams of CaCO₃ and then 19 grams of toluene diisocyanate (80 percent 2,4; 20 percent 2,6 isomer) are added.

The composition is then cured for 30 minutes at 150°C.

The components of suitable compositions, such as those listed above, can be changed in accordance with known technology to vary the properties of the elastomeric products within the acceptable ranges listed in TABLE I. For instance, the crosslinking density of the above-mentioned product of Example III of U.S. Pat. 3,595,814 can be lowered by using a higher molecular weight polyoxypropylene triol and/or less trimethylol propane to give a product having a higher elongation.

The top coating of polyurethane should be about 0.5 to 6 mils thick. The coating should have high abrasion resistance, proper friction characteristics and resistance to staining and soiling. Generally, the abrasion resistance of the top coating is much higher than that of the material used in the polyurethane elastomer layer.

The required properties of the top coating are given in TABLE II.

TABLE II

| POLYURETHANE TOP COAT PROPERTIES | |
|---|---|
| Property | Requirement |
| Taber Abrasion[1] (weight loss in milligrams) | 0 to 500 |
| Ultimate Elongation (percent) | 80 minimum |
| Cold Crack (180° Bend) | Pass 40°F. |
| Water Absorption[2] | 0 to 8 |

[1]CS-17 wheel, 500 grams per wheel, 5,000 cycles, total weight loss in milligrams.
[2]168 hours at 23°C., percent weight gain.

The top coating should have the same hole resealing property as the elastomeric layer. Additionally, it is preferred that the polyurethane composition of the top coating be thermosetting in order to obtain a resistance to burning cigarettes similar to that of the preferred urethane elastomers.

To have a safe surface for athletic events the coefficient of friction between the surface and the soles of athletic footwear cannot be too low or it will be slippery or too high, or it will cause unduly sudden stops. In general, the coefficient of static friction between the top coating and leather, polyvinyl chloride and neoprene, both dry and wet, should be in the range of 0.4 to 1.5 as measured by ASTM D-1894-63.

Specific examples of polyurethane top coating compositions meeting the requirements of this invention are set forth below. In each of these examples, the isocyanate-polylol adduct was prepared by adding the isocyanate slowly to a mixture containing the remaining ingredients while controlling the conditions so that the temperature did not exceed about 60°C. The mixture was then slowly heated to about 75° to 100°C. and maintained at that temperature until the free isocyanate content was approximately constant.

| | | Grams |
|---|---|---|
| (F) | Polypropylene Adipate (Equivalent weight 560) | 560 |
| | 2,4 Toluene Diisocyanate | 140 |
| | Di tert. Butyl p Cresol | 1 |
| | Dimethyl Silicone Oil (200 CSTK) | 0.2 |
| | Titanium Dioxide Pigment | 140 |
| | Carbon Black Pigment | 10 |
| | Silica (passes 400 mesh) | 100 |
| | Silica Aerogel | 30 |
| | Xylol | 150 |
| | Toluol | 250 |
| | Ethyl Acetate | 100 |

The mixture was formed into a thin layer and cured for one week at 35 percent relative humidity to give a product having the following properties (measured by test methods of TABLES I and II).

| Properties | Requirements |
|---|---|
| Hardness (Shore A) | 80 |
| Ultimate Elongation (percent) | 180 |
| Ultimate Tensile Strength (p.s.i.) | 3,000 |
| Taber Abrasion | Less than 75 milligrams loss |
| Tear Strength (Die C, p.l.i.) | 300 |
| Water Absorption (percent) | less than 2 |
| Cold Crack (180° Bend) | Pass 40°F. |
| (G) Polyethylene Adipate (MW 2000) | 63.6 |
| 3,3' Diphenylmethane Diisocyanate | 36.4 |
| Butylated Hydroxy toluene | 0.1 |
| 2,2',4,4', Tetrahydroxy benzophenone | 0.1 |
| Silica Aerogel | 5 |
| Toluol | 60 |
| Methyl ethyl ketone | 40 |

After being formed into a thin layer and cured as in Example (F), a product was obtained having the following properties:

| | |
|---|---|
| Hardness (Shore A) | 75 |
| Ultimate Tensile Strength (p.s.i.) | 4,000 |
| Ultimate Elongation (percent) | 300 |
| Tear, Die C (p.l.i.) | 350 |
| Taber Abrasion | Less than 50 milligrams loss |
| Water Absorption (percent) | less than 2 |

The floor covering has a total thickness of about 7/64 to ¾ of an inch, weights about 60 to 450 ounces/square yard, has a resilience of about 20 to 50 as measured by the method described in TABLE I, passes flammability, pill test (DOC-FF-1-70) tested on its face, possesses a face hardness of 30 to 90 as determined by the procedure described in TABLE I and has a thermal expansion of less than 0.005 in./ft./°F. The basketball bounce of the product meets the minimum requirement of 49 inches as determined by the NCAA test method (a regulation basketball which meets the required 49 inch minimum rebound specification when dropped on a hardwood floor is dropped from a height of 6 feet, measured from the bottom of the ball, and the rebound height to the top of the ball is measured).

Where it is desired to provide surface having a high coefficient of static friction suitable for track events, this can be obtained by modifying or roughening the product of the present invention. Thus, for instance, a strip going around the outside of an installation can be modified to provide a running track. Suitable procedures for accomplishing such modification include embossing the top surface of the floor covering and incorporating particulate matter into the top surface such as by gluing particles of polyurethane elastomer to the top of the elastomer layer prior to the addition of the top coating. In the modified or roughened areas the layer of polyurethane elastomer can be thinner and can have a thickness of only 1/32 of an inch.

The floor covering is installed by adhesively bonding the bottom fiber layer to the floor of the athletic facility. If desired, adhesives can be used which form a moisture barrier between the floor and the bottom fiber layer.

The following example is given to further illustrate the invention, but it is to be understood that the invention is not to be limited in any way by the details described therein.

EXAMPLE

A sample of a composite needlepunched material was prepared by needling a batt of polypropylene fibers having a weight of 30 ounces per square yard into a scrim of polypropylene yarn having a weight of 3.4 ounces/square yard using a needling density of 800 punches per square inch. A fibrous layer 1/5 inch thick was attached to one side of the scrim while fiber ends protruded through the other side of the scrim. The protruding fibers were impregnated with a latex coating of 7 ounces per square yard. The resilience (measured as in TABLE I) of the composite product was 18.

A ⅛ inch thick layer of polyurethane elastomer was applied to the latex coating and cured by heating at 275°F. for 20 minutes. The polyurethane elastomer employed was a commercially available product similar to the carbamate containing composition described in Example III of U.S. Pat. No. 3,598,814 except that it had a somewhat lower crosslink density. The cured elastomer had the properties set forth in TABLE III, the test procedures being the same as those set forth in TABLE I.

TABLE III

| | |
|---|---|
| Weight | 125 oz./sq. yd. |
| Density | 1.4 grams/cm³ |
| Hardness (Shore A) | 60 |
| Resilience (Percent Rebound) | 35 |
| Compression Set (Percent) | 4 |
| Compression Strength 10 percent deflection (p.s.i.) | 100 |
| Compression Strength 50 percent deflection (p.s.i.) | 500 |
| Ultimate Elongation (percent) | 300 |
| Tear Strength (p.l.i.) | 100 |
| Cold Crack (180° Bend, No Crack) | Pass 0°F. |
| Water Absorption (percent) | Less than 2 |
| Taber Abrasion (weight loss in milligrams) | 1,000 |
| Flammability, Pill Test | Pass |

A polyurethane top coating solution was spread on top of the elastomer layer to give a coating of about 3 mils thick. The coating composition was that described above in Example (F) and it was cured for one week at room temperature and at least 35 percent relative humidity.

When the final multilayer product was walked on with ¼ inch and ⅜ inch runners needle spikes the holes in the top coating and elastomer layers completely reclosed after removal of the spikes and when a king sized cigarette was laid flat on the product surface and allowed to burn from end to end there was no deformation of the product surface. Other properties are set forth in TABLE IV with the test procedures being the same as those described in TABLES I and II.

TABLE IV

| PRODUCT OF EXAMPLE | |
|---|---|
| Thickness (inches) | ⅜ |
| Face Hardness (Shore A) | 60 |
| Resilience (percent rebound) | 35 |
| Basketball Bounce (inches) | 49 |
| Taber Abrasion (mgm weight loss) | Less than 75 |
| Thermal Expansion (in./ft./°F.) | Less than .001 |
| Cold Crack (180° Bend) | No Crack 40°F. |

TABLE IV-continued

PRODUCT OF EXAMPLE

| | | |
|---|---|---|
| Fadeometer (hours to appearance change) | | 200+ |
| Flammability, Pill Test, Face | | Pass |
| Coefficient of Static Friction of Top Surface (ASTM D-1894-63) | | |
| Vs leather | (Wet | 0.8 |
| | (Dry | 0.4 |
| Vs PVC | (Wet | 1.0 |
| | (Dry | 0.6 |
| Vs Neoprene | (Wet | 0.8 |
| | (Dry | 0.6 |

It will be apparent that many modifications and variations may be effected without departing from the scope of the novel concepts of the present invention and the illustrative details disclosed are not to be construed as imposing undue limitations on the invention.

In the claims, the properties recited are based on the test methods described in the specification.

We claim:

1. A multilayer product suitable for use as a floor covering of an athletic facility comprising a composite needlepunched material having a fiber batt bottom layer at 10 to 80 ounces per square yard needled into a support layer of fabric or film so that a minor portion of the fiber batt protrudes through the top of said support layer and a major portion of the fiber batt remains as a fibrous layer at least 1/16 inch thick attached to the bottom of said support layer; a layer of polyurethane elastomer of from 3/64 inch to ⅜ inch thick adhered to the top of said composite needlepunched material, said polyurethane elastomer having a Shore A hardness of 30 to 90, a resilience of 20 to 50 percent rebound, a compression set of not greater than 35 percent, an ultimate elongation of at least 80 percent, an ultimate tensile strength of at least 200 p.s.i., a density of 0.5 to 1.6 gm./cm.$^3$ and a tear strength of at least 50 p.l.i,; and a wear coating of polyurethane having a high abrasion resistance adhered to the top of said layer of urethane elastomer said wear coating providing said multilayer product with a smooth surface.

2. A multilayer product as claimed in claim 1 wherein said wear coating has a Taber Abrasion of 0 to 500 milligrams weight loss with a CS 17 wheel, 500 grams per wheel and 5,000 cycles.

3. A multilayer product as claimed in claim 1 wherein said polyurethane elastomer and said polyurethane wear coating are thermoset materials which are resistant to burning cigarettes.

4. A multilayer product as claimed in claim 1 having a thickness of about ⅛ to ¾ inch, a weight of about 60 to 450 oz./sq./yd., a resistance of 20 to 50 percent rebound and a thermal expansion of less than 0.005 in./ft./°F.

5. A multilayer product as claimed in claim 1 wherein the portion of the fiber batt protruding through the top of the support layer is impregnated with a latex composition.

6. A multilayer product as claimed in claim 1 wherein said wear coating provides a smooth surface having a coefficient of static friction of about 0.4 to 1.5 versus dry and wet leather, polyvinyl chloride and neoprene as measured by ASTM-D-1894-63.

* * * * *

UNITED STATES PATENT AND TRADEMARK OFFICE
CERTIFICATE OF CORRECTION

PATENT NO. : 3,937,861
DATED : February 10, 1976
INVENTOR(S) : Joseph L. Zuckerman, Carl R. Eckardt and Robert V. Bertotti It is certified that error appears in the above-identified patent and that said Letters Patent are hereby corrected as shown below:

Column 2, line 34  "as" should read  -- is --.

Column 3, line 35  "Examples II and III" should read -- Examples II and VIII --.

Signed and Sealed this

Twenty-seventh Day of July 1976

[SEAL]

Attest:

RUTH C. MASON
*Attesting Officer*

C. MARSHALL DANN
*Commissioner of Patents and Trademarks*